United States Patent [19]
Li et al.

[11] Patent Number: 5,884,097
[45] Date of Patent: Mar. 16, 1999

[54] DATA STRUCTURE AND METHODS FOR DEFINING AND USING ATTRIBUTE DATA BLOCKS TO INSTANTIATE OBJECTS AND DESCRIBE CHANGES TO OBJECTS

[75] Inventors: Shih-Gong Li; Yun-Yong Shen, both of San Jose; Sing Ban Robert Tien; Tu-Hsin Tsai, both of Saratoga; Ching-Yun Yang, San Jose, all of Calif.

[73] Assignee: Intertop Corporation, Saratoga, Calif.

[21] Appl. No.: 857,231

[22] Filed: May 17, 1997

[51] Int. Cl.$^6$ .................................................. G06F 13/00
[52] U.S. Cl. ................ 395/863; 395/200.31; 395/200.75
[58] Field of Search .................................... 395/683, 684, 395/200.31, 200.33, 200.35, 200.32, 200.43, 200.6, 200.75, 200.76; 707/103

[56] References Cited

U.S. PATENT DOCUMENTS

| | | | |
|---|---|---|---|
| 5,129,083 | 7/1992 | Cutler et al. | 707/103 |
| 5,313,636 | 5/1994 | Noble et al. | 707/1 |
| 5,410,702 | 4/1995 | Abraham et al. | 395/683 |
| 5,432,936 | 7/1995 | Gray et al. | 395/705 |
| 5,481,718 | 1/1996 | Ryu et al. | 395/683 |
| 5,778,227 | 7/1998 | Jordan | 395/682 |

*Primary Examiner*—Dung C. Dinh
*Attorney, Agent, or Firm*—Joseph M. Villeneuve; Beyer & Weaver, LLP

[57] ABSTRACT

A data structure and method are disclosed for transferring object attributes between platforms in a distributed computing environment. The method includes creating an application description file. The application description file includes a type ID and an object name. The type ID references a type information file. The application file includes an attribute data block and the attribute data block contains data for attributes that are included in the object. The attribute description file is transferred to a platform that includes the type information file and the type information file includes a memory offset map that determines a sequence of attribute data storage in the attribute data block. Thus, the object attributes are received by the platform and the type information file provides a memory offset map for individual attributes in the attribute description file.

17 Claims, 9 Drawing Sheets

DATA STRUCTURE AND METHODS FOR DEFINING AND USING ATTRIBUTE DATA BLOCKS TO INSTANTIATE OBJECTS AND DESCRIBE CHANGES TO OBJECTS

BACKGROUND OF THE INVENTION

1. Field of the Invention

The present invention relates generally to data structures and methods for improving data transfer in object oriented distributed applications. More specifically, the invention relates to data structures and methods for defining and using attribute data blocks to instantiate objects and to communicate objects or object information among different machines running a distributed application. The distributed application may be run over the Internet or an intranet.

2. Description of the Related Art

Object oriented programming is a useful programming technique that results in code that may be conveniently debugged and maintained. One object oriented technique referred to as encapsulation includes or encapsulates data inside of an object that also contains methods and events. In an application such as a distributed application where data is processed in more than one location and frequently transferred between locations, encapsulation can result in excessive demands on the data channel between machines running the application.

One way of transferring data between machines, usually from a server to a client, is hypertext markup language (HTML). When HTML is used, each time the user of a client machine selects hypertext on, for example, a web page, the server supporting that page transmits or "pushes" an entirely new page over the communication link between the machines, e.g., the internet, even where the new page differs from the previous page in only some small, incremental aspect. With the size of these pages being relatively large and the amount of traffic on the World Wide Web ever increasing, it would be desirable if the transmission bandwidth required by this technology could be reduced.

The Java virtual machine (JVM) and the Java programming language represent a significant improvement in the efficiency with which such interactive content may be transmitted between client and server platforms. Initially, when a client requests that a particular Java object subclass on the server platform be instantiated on the client platform, the server sends the subclass definition and the actual application or applet program associated with that subclass including any methods and data required to execute the object. Java's advantage over HTML is realized for each subsequent request from the client for that subclass. This is because the JVM determines the information delta, that is, the information which has changed for that object instance since the last request, and transmits only the delta for the subsequent request. This information delta is typically much smaller than the original amount of information transmitted with the object although there may significant overhead associated with identifying individual data fields within the delta transmission.

Although the delta method implemented in Java as described above is relatively efficient for simple data transmission, the amount of bandwidth required to perform relatively simple operations associated with a distributed applications is large. For example, a class of object called a button class may be described for an application. Each instance of the button class includes methods, events and data. Each time a new button is created by the server or the client, if the client is given that privilege, a new instance of the class button is created. In order to transfer the data associated with the new button from one machine to another, the data is encapsulated in an object that includes, among other things, all of the methods and events that are included in button objects.

The number of methods can become very large since, in general, for each attribute of the object, there is a set method and a get method used to store and retrieve attribute data from memory. The JVM compiles the different methods to handle storing and retrieving data. When an attribute of an object is changed, for example, by a client, the attribute is encapsulated in an object and the amount of information that is sent from the client must include set and get methods for each attribute. Each set and get method is compiled and used to pass data to and from memory for its corresponding attribute. Thus, while representing a considerable conservation of bandwidth resources with respect to HTML, Java as currently used still requires a relatively large amount of bandwidth for sending data.

What is needed is an alternative to the object oriented model for instantiating objects and passing objects and attribute data that is encapsulated within objects between machines that are running a distributed application. It would be useful if a way could be found of retaining the benefits of object oriented programming in the conceptualization of a program, while detaching data from an encapsulating object in an implementation so that the process of instantiating an object could be simplified and the bandwidth requirements of a channel transferring data between machines running a distributed application could be reduced.

SUMMARY OF THE INVENTION

Accordingly, the present invention provides a data structures and methods for improving data transfer in object oriented distributed applications. Data is detached from an object so that the amount of channel bandwidth necessary to create a subclass or instantiate an object that must be sent over a data channel connecting machines running a distributed application is greatly reduced. Furthermore, the amount of data transfer necessary to change data associated with an object is greatly reduced and the process of reading data into memory is simplified because data is transferred by plugging an entire attribute data block into memory, not by setting data to memory attribute by attribute. In one embodiment, the present invention provides a data block format. When it is desired to send information from one machine to another machine over an internet, intranet, or other data channel, certain data attributes associated with an object are detached from the object, stored in a determined data attribute block format, and transferred. The machine receiving the data receives a complete data block that is plugged directly into the correct memory location so that it is attached to the correct encapsulating object.

It should be appreciated that the present invention can be implemented in numerous ways, including as a process, an apparatus, a system, a device, a method, or a computer readable medium. Several inventive embodiments of the present invention are described below that may be practices separately or combined.

In one embodiment, A method of transferring object attributes between platforms in a distributed computing environment includes creating an application description file. The application description file includes a type ID and an object name. The type ID references a type information file. The application file includes an attribute data block and the attribute data block contains data for attributes that are included in the object. The attribute description file is transferred to a platform that includes the type information file and the type information file includes a memory offset map that determines a sequence of attribute data storage in the attribute data block. Thus, the object attributes are received by the platform and the type information file provides a memory offset map for individual attributes in the attribute description file.

In another embodiment, a type information data structure for storing information associated with an object type that is used to instantiate objects of the object type includes an attribute definition block including a memory map block, a default value block, and an upper-lower value block. The memory map block includes a list of attribute ID blocks, the attribute ID blocks including a name and type block, a default offset block, and an upper-lower offset block. The default value block includes a default value associated with an attribute ID block at a location specified by the default offset block. The upper-lower value block includes an upper-lower limit associated with an attribute ID block at a location specified by the default offset block. Thus, the type information is stored so that objects of the object type may be instantiated.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 2A:
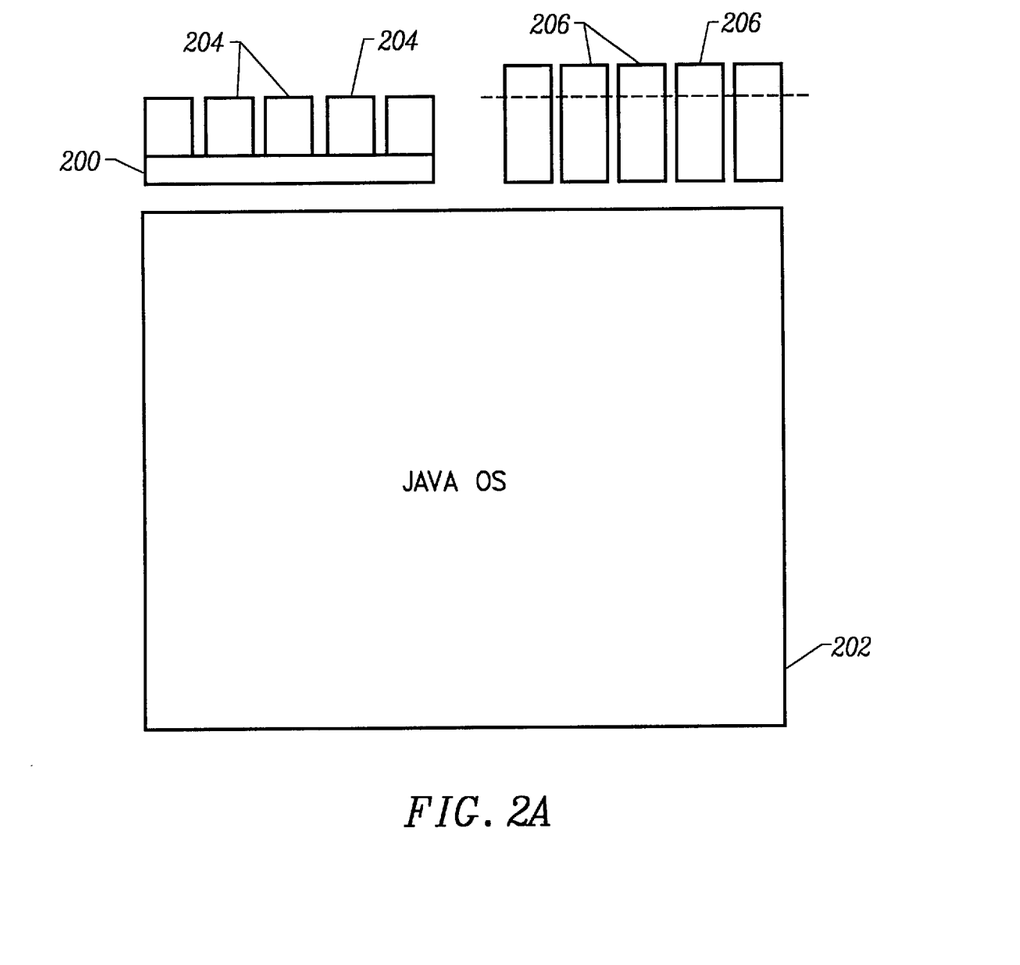
FIG. 2A illustrates a comparison of application files visually.
Figure 2B:
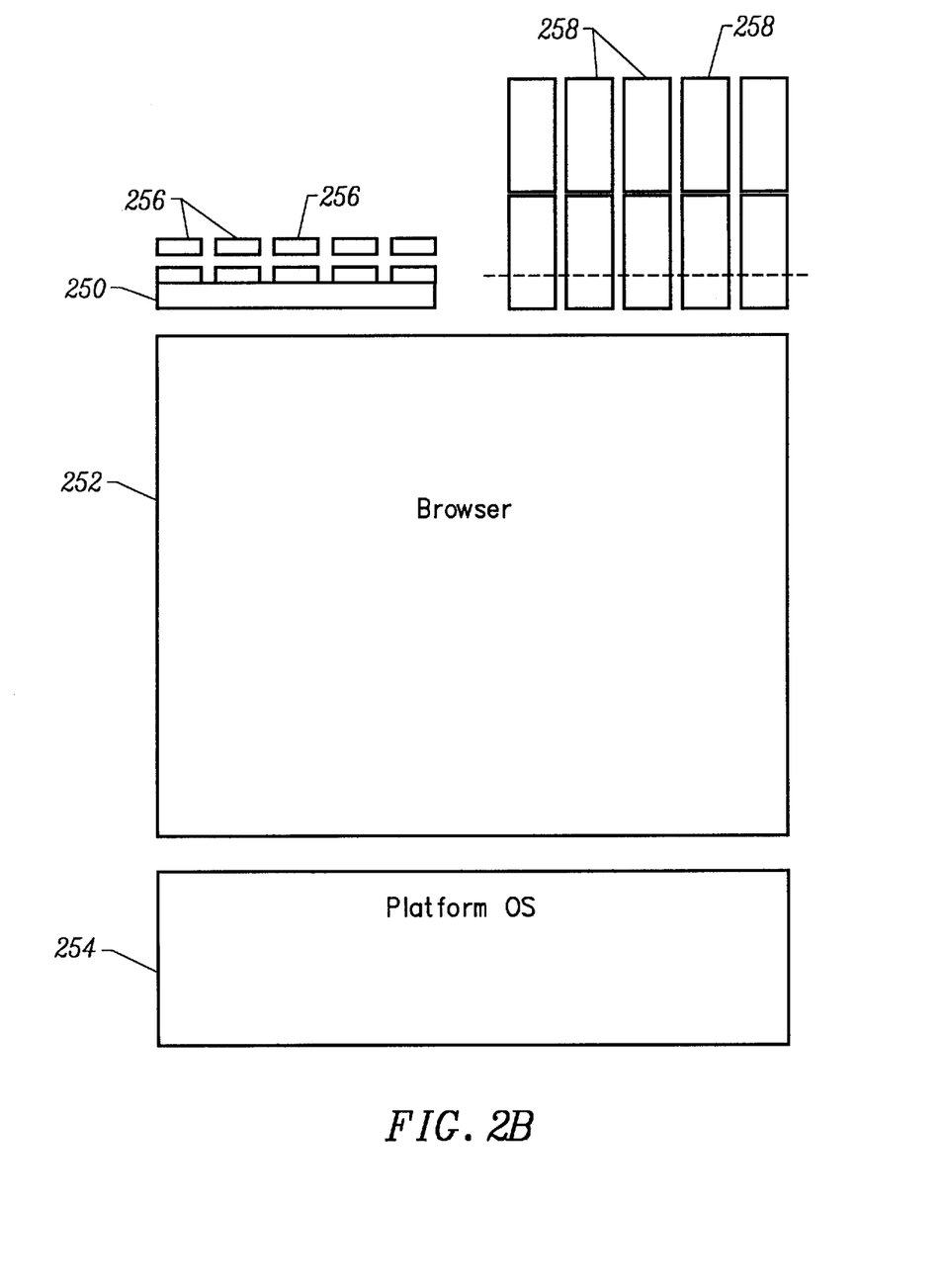
FIG. 2B illustrates a visual comparison of the file size advantage of the present invention over HTML.

As described in U.S. patent application Ser. No. 08/858, 095 (pending) which is herein incorporated by reference for all purposes, an Inttop Virtual machine extension (VMX) is implemented that is operable to instantiate objects and create subclasses based on certain information obtained from attribute data blocks such as are described in FIG. 2. The VMX contains a library of types of objects that may be specified in an object type info block, selected factory methods that may be listed in a method information block, and selected factory events that may be listed in an event information block. Attribute definition blocks are defined for each object type. Attribute definition blocks include default data that is used by the VMX to instantiate an object of a specific type. Attribute definition blocks are divided into common attribute definition blocks, customized attribute definition blocks, and data attribute definition blocks.

In contrast to other systems which require a set and get method for each attribute defined, even when the attributes are of the same data type, the present invention provides, in one embodiment, a single set and get method. The set and get methods include the attribute as an argument and an index is provided that maps the argument to the proper memory location. Thus, data may be pushed directly into the proper memory location, without the need to compile separate set and get methods. Part of the function usually provided by the compiler that compiles multiple set and get methods and maps them to the correct memory location is thus accomplished by a handler in the VMX that uses an the index to determine the memory location as is described below. Even more importantly, when attributes encapsulated within an object are modified on a first machine that is running part of a distributed application and sent to a second machine, the attributes are sent in the form of attribute data blocks that are plugged directly into memory on the second machine by the VMX, thus updating the object in a highly efficient manner.

Figure 1:
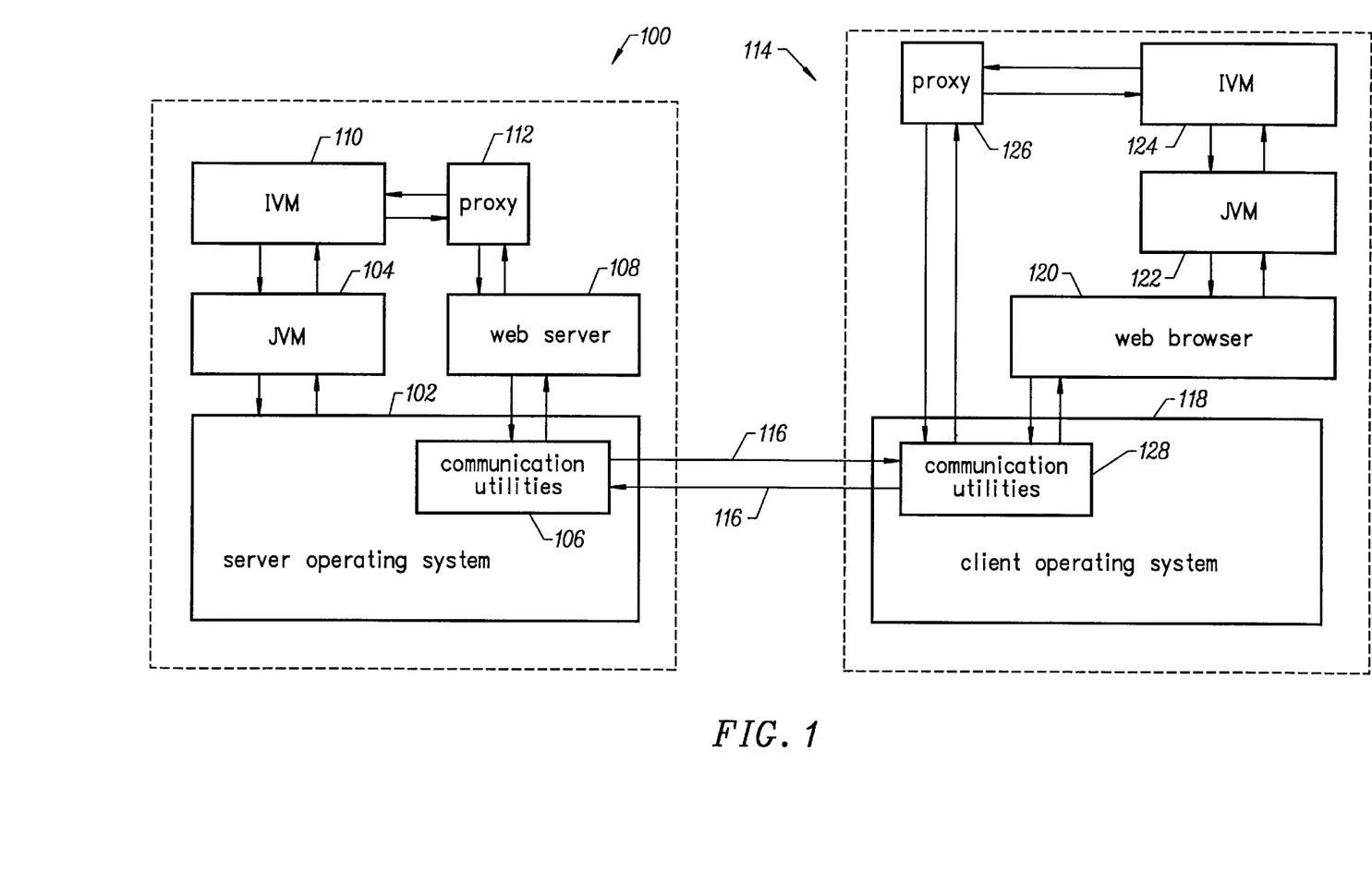
FIG. 1 is a block diagram of a hardware and software environment for use with a specific embodiment of the present invention.

FIG. 1 is a block diagram of a hardware and software environment for use with a specific embodiment of the present invention. A server platform 100 comprises a server operating system (OS) 102 upon which the Java virtual machine (JVM) 104 operates. Communication utilities 106 are controlled by OS 102 and enable communication with the outside world. A web server 108 is also shown operating on top of OS 102 and in two-way communication with communication utilities 106. Virtual machine extension (VMX) 110 operates on top of JVM 104 and may communicate to the world outside platform 100 via the two-way communication path through JVM 104 and OS 102. VMX 110 is also equipped with a communication stub or proxy 112 which enables two-way communication to the outside world either via web server 108, or directly via communication utilities 106.

A client platform 114 is connected to server platform 100 via communications link 116 which, it will be understood, may represent a variety of network architectures having varying levels of complexity. The exact implementation of link 116 is not particularly relevant to the present invention. Client platform 114 comprises a client OS 118 upon which a browser 120 may be operating. It should be noted, however, that the existence of browser 120 is not necessary for the present invention. For example, OS 118 may comprise a set-top box, the operating system of which provides internet browsing functions. On top of browser 120 (or OS 118 if no browser is used), the client-side JVM 122 operates. Client-side VMX 124 operates on top of JVM 122 through which it may communicate with OS 118 and thus the world outside platform 114. As with server-side VMX 110, client-side VMX 124 is similarly equipped with a proxy 126 which enables two-way communication with the outside world via communication utilities 128.

On some client platforms, the VMX must be downloaded each time the client system begins operating or each time the client platform changes the URL with which it is communicating. For example, if browser 120 is the widely used Netscape browser, the memory cache which holds the VMX is dumped each time the user quits the Netscape browser application or selects a different URL. The cache is dumped when switching URLs due to a security mechanism enforced by the Netscape browser as well as many other browsers. This does not, however, represent a disadvantage with respect to Java because the entire VMX in combination with the first requested application description file is often smaller than a single comparable Java application file. As will be understood, the file size advantage of the present invention grows with each additional requested application file. A comparison of application files is shown visually in FIG. 2a. VMX 200 (about 50 kilobytes) is shown operating on top of Java operating system 202. On top of VMX 200 are five Inttop application files 204, each occupying approximately 60 kilobytes of memory space. On top of Java OS 202 are five comparable Java application files 206, each occupying about 150 kilobytes of memory space. These file sizes are based on typical applications with very simple functions. It is apparent that a file size advantage, i.e., 40 kilobytes, is realized with the downloading of the entire VMX 200 and one Inttop application file 204 versus a single Java application file 206. It is also apparent that the advantage increases with each new application file, i.e., an additional 90 kilobytes for each. For the five files shown, the advantage is 400 kilobytes.

At least initially (i.e., for the first few pages downloaded from a remote server), there is less of an advantage versus HTML because HTML files are typically smaller than the VMX. However, given that the vast majority of HTML Internet transactions involve sequentially downloading multiple HTML pages, the file size advantage of the present invention begins to dominate very quickly with each additional page request. In addition, this analysis does not take into account the processing power advantage enjoyed by the present invention over the limited capabilities of HTML. That is, multiple HTML pages along with some server side operations are typically required to provide the functionality of a single Java or Inttop applet. A visual comparison of the file size advantage of the present invention over HTML is shown in FIG. 2b. VMX 250 occupying about 50 kilobytes of memory space is shown operating on top of browser 252 which is operating on top of platform operating system 254. Ten Inttop application files 256, each about 5 kilobytes, are shown on top of VMX 250. Ten comparable HTML files 258, each about 20 kilobytes, are shown on top of browser 252. It is apparent that the file size advantage of the present invention overcomes HTML when the fourth of each type of application file is downloaded (70 vs. 80 kilobytes). As mentioned above, given that, on average, the typical user goes well beyond four pages on a given URL, the file size advantage of the present invention will come into play more often than not. For the ten files shown, the advantage is 100 kilobytes.

The VMX employs generic object types each of which comprises the internal interface behavior common to the objects of that type. Much of the information required for the instantiation of a particular type of object is inherent in the VMX as part of the corresponding TYPE INFO file (approximately 200 bytes) downloaded to the client platform with the VMX. In cases where an application description file calls for instantiation of an object type for which a TYPE INFO file is not already included in the VMX, the corresponding TYPE INFO file must be downloaded into the VMX. This may be done when the application description file is transmitted to the requesting platform (as an appended file). It may also be done when the VMX attempts to instantiate the object type and realizes it doesn't have the appropriate TYPE INFO file. At that point, the VMX requests the new TYPE INFO file from the server which transmitted the application description file.

Figure 3:
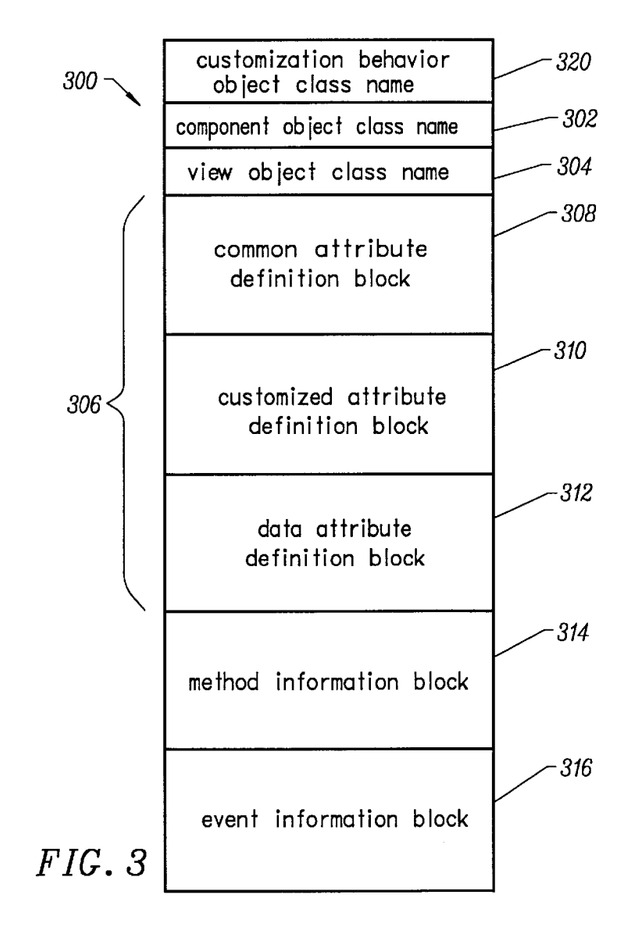
FIG. 3 illustrates the structure of a typical TYPE INFO file.

As discussed above, depending upon the configuration of the requesting platform, the entire VMX may need to be downloaded each time the client platform begins operation. This would then also be true for any new TYPE INFO files downloaded during a previous session. That is, the new TYPE INFO file would need to be downloaded at least once each session the first time an application using that object type is requested. This is true, for example, in the Netscape environment which does not provide for long term storage of such information. If, however, the platform allows for caching of such files (e.g., a set-top box operating system) the new TYPE INFO file can become resident on that platform for future use by other applications. The structure of a typical TYPE INFO file 300 is shown in FIG. 3.

At the beginning of the file is a component object class field 302 which specifies the name of the requested Java component object class. If there is a view associated with the component class, the Java view object class name is specified in field 304. Thus, the VMX employs traditional Java component and view object classes. Attribute information block 306 contains three subcategories of attribute definition information. In common attribute definition block 308, a memory map and default values for attributes common across all object types are stored. In customized attribute definition block 310, a memory map and default values for attributes specific to the requested instance are stored. Finally, data attribute definition block 312 contains a memory map and default values for attributes that are considered as data to be processed in the conventional data processing tasks.

After data attribute information block 306, method information block 314 includes information about the various methods associated with the object type including the method names and signatures (i.e., arguments). Event information block 316 includes the names and signatures of event responses employed by the object type to events such as, for example, a mouse click or movement. These basic fields and data blocks, are part of every TYPE INFO file. However, if a Java programmer wishes to create a new object type with more sophisticated behavior than one of the standard TYPE INFO files, he may insert additional Java object class fields for each new behavior desired. These might include, for example, a customization behavior object class name field 320 which refers to Java object classes exhibiting the additional behavior desired for the new object type. The capability of incorporating such additional object class behavior to create a new Inttop object type will typically not be available to the application programmer. New object types exhibiting such behavior will most likely be provided by Inttop or its third party vendors.

Figure 4:
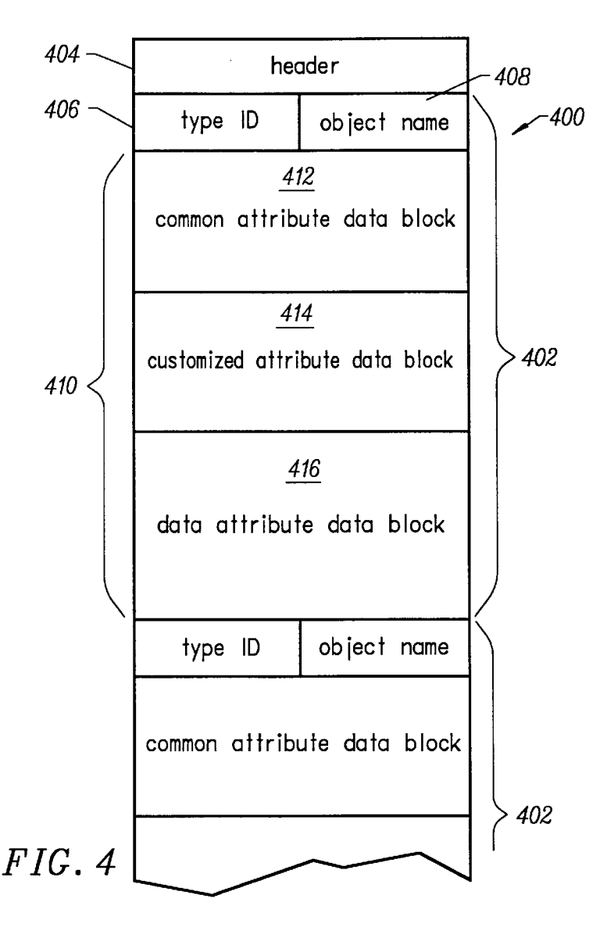
FIG. 4 illustrates the structure of an application description file.

An object can be instantiated from the TYPE INFO file using the default data contained in attribute information block 306. Once the data has been changed, the actual attribute data for each instance of a particular object type and the methods called out in method information block 314 are contained in an application description file which employs instances of the object type. An application description file corresponds to the Inttop application or applet. The structure of an application description file 400 is shown in FIG. 4. A portion 402 of application description file 400 is occupied by attribute data for each of the component object instances employed by the application. The application is identified by a header 404 which contains the application name, a universally unique application ID, the size of the application description file, the application version number, and a check byte field which indicates whether the file is a correct Inttop application description file. [what do you mean by "correct"? uncorrupted?]. Each portion 402 includes a TYPE ID field 406 for identifying the object type, and an object name field 408 for identifying the particular object instance. Following these fields within each portion 402 is attribute data block 410 which includes common attribute data block 412, customized attribute data block 414, and data attribute data block 416. These three data blocks contain the actual data that describes the particular instance of the component object class identified by the particular portion 402 and are in the format defined in the associated TYPE INFO file corresponding to the component type.

Typically, the application description files are stored in a repository on the server platform. When the client platform requests a particular Inttop application or applet, the server transmits the corresponding application description file. The size of a typical application description file is relatively small (e.g., 60 kilobytes) when compared to a similar Java application employing comparable Java subclasses (e.g., 150 kilobytes). The objects employed by the application are then instantiated on the client platform using the attribute data from the application description file and the type information in the TYPE INFO file (which is typically inherent in the VMX).

When a client platform requests that a particular Inttop application resident on the server platform be downloaded to the client side, the server determines whether the VMX has been downloaded to the client platform. If not, the VMX, which includes a number of TYPE INFO files, (altogether approximately 50 kilobytes) is transmitted to the client along with the requested application description file.

Figure 5A:
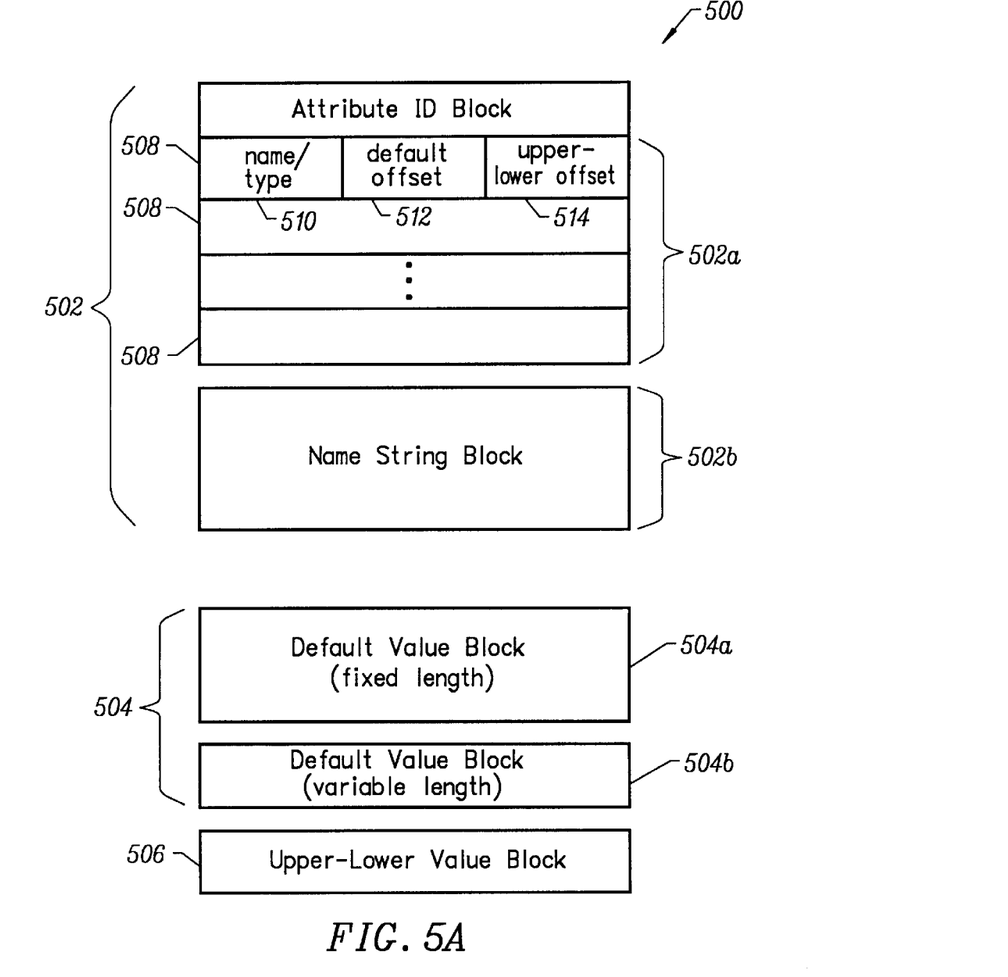
FIG. 5A is a block diagram of a typical attribute definition block.

FIG. 5A is a block diagram of a typical attribute definition block 500 that is included in attribute information block 306 which is part of TYPE INFO FILE 300. Attribute definition block 500 is divided into three parts, including a memory map block 502, a default value block 504, and an upper-lower value block 506. Memory map block 502 includes an attribute ID list block 502a and a name string block 502b that stores the string names for each of the attribute ID's. Default value block 504 contains a fixed length default value block 504a that stores fixed length data in the case of defined numerical types and sequence numbers in the case of string types. The sequence numbers stored in fixed length default value block 504a specify the sequential position of a string in variable length default value block 504b. This enables values stored in the default value block to be found using an offset. Variable length string data is stored separately and a sequence number specifies the sequential position in variable length default value block 504b. In the embodiment shown, Upper-lower value block 506 does not need to include a variable length and a fixed length block because default values are not specified for strings. In other embodiments, default values might be specified for strings.

Memory map block 502 specifies the name of each attribute that is included in TYPE INFO FILE 300. Memory map block 502 also specifies the data type of the attribute and specifies an offset that provides a map to the location of the default data provided in default value block 504. The same map that specifies the offset for default data is also used to specify the offset of input data or modified data when data is input into an object or received for an object from another platform in the form of an attribute data block. Since each object that is instantiated for a given type organizes its data in the same manner as the default value block of the type, the offsets in the memory map block of the type are valid for the object data. Memory map block 502 includes one or more attribute ID's 508. As is described below, when an application is run, a Type Info object is instantiated in memory from the Type Info file and a index/name table is generated that provides the memory location offset where each attribute is stored. When the application instantiates application objects of the Type Info object type, attribute data for the application objects is stored in the same format as the default data is stored in the Type Info object so that the Type Info index/name table can be used to access attribute data in application objects.

Figure 5B:
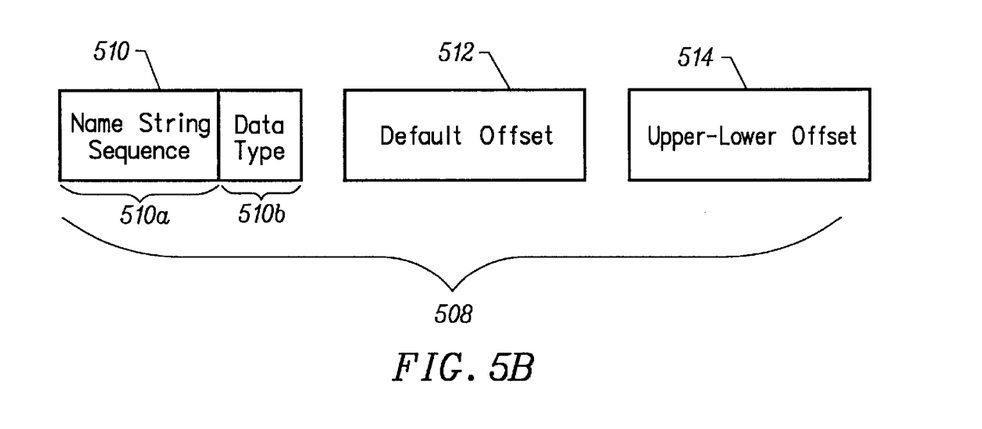
FIG. 5B is a block diagram showing the detailed structure of an attribute ID block.

FIG. 5B is a block diagram showing the detailed structure of an attribute ID block 508. Attribute ID block 508 includes a name/type block 510, a default offset block 512, and a upper-lower value offset block 514. In one embodiment, 6 bytes total are allocated to each attribute ID and 2 bytes each are allocated to name/type block 5 10, default offset block 512, and upper-lower value offset block 514. The two bytes allocated to name/type block 510 include 12 bits that are used to store a sequence number that refers to a string name that is included in name string block 504b. The remaining 4 bits in name/type block 510 contain a code that specifies the data type of the attribute. In one embodiment, the following data types are supported:

| Data Type | Bytes |
|---|---|
| short | 2 |
| int | 4 |
| long | 8 |
| float | 4 |
| double | 8 |
| string | 2 (sequence number) |

Thus, name/type block 510 specifies the sequential location of the name string in name string block 540b and specifies the attribute data type. Default offset block 512 contains the offset in the default value block of the location where the default value of the attribute may be found in the default value block. Upper-lower value offset block 514 contains the offset in upper-lower value block 506 of the location where the upper and lower values for the attribute are specified in the upper-lower value block.

When an object is instantiated without real input data, the default data specified in the default value block is used. Upon instantiation, the offset specified in Default offset block 512 specifies the offset in the attribute data block of the location in the data attribute block where the actual data value encapsulated within instantiated object is found. It should be noted that, when an object is instantiated, the attribute data block data is stored in memory and the index/name table of the Type Info Object associated with the object is used to find the memory offset for each attribute.

As noted above, there are three different kinds of attribute definition blocks including common attribute definition blocks, customized attribute definition blocks and data attribute definition blocks. It is possible to use the attribute definition block shown in FIGS. 5A and 5B for all three types of attribute definition block. In certain embodiments, however, the fact that the common attribute definition block is the same for all types is used to eliminate the need for a memory map block 502. Since the common attributes are the same for all types, they are well known by the VMX and it is not necessary to provide a memory map for every object type that is instantiated.

Figure 5C:
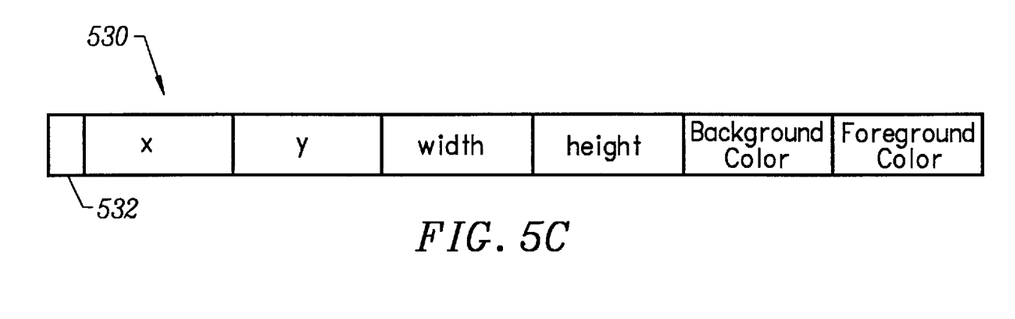
FIG. 5C illustrates a format that is used for a common attribute data definition block.

FIG. 5C illustrates a format that is used for a common attribute data definition block 530 that includes a default data block 532. In one embodiment, Default data block 532 is 25 bytes long. The first byte is divided into 8 bits. 3 of those bits are used to define whether the object is visible, valid, or enabled. The remaining 5 bits are reserved. The next 24 bits are divided into 6 segments of 4 bytes each and those segments specify x position, y position, width, height, background color, and foreground color. Thus, for the common attribute block, it is only necessary to specify the actual data that fills in the block since the memory map and upper-lower values for the attributes included are the same for all types and are known by the VMX. Of course, in some embodiments, these could still be specified. Significant savings in memory and communication bandwidth, however, is saved by classifying the attribute definition blocks according to the extent that they change for different objects. Common attributes are common to all objects. Therefore it is efficient to include their format in the VMX. The distinction between data attributes and custom attributes likewise is useful. Data attributes are attributes that are expected to change often as a user inputs data. Custom attributes, although different for different type objects, nevertheless do not change regularly as a result of user input. By separating the two, it is possible to avoid transferring the custom attribute values between platforms every time that a data attribute must be transferred. Data attribute data can be sent independently as part of a data attribute data block.

Figure 5D:
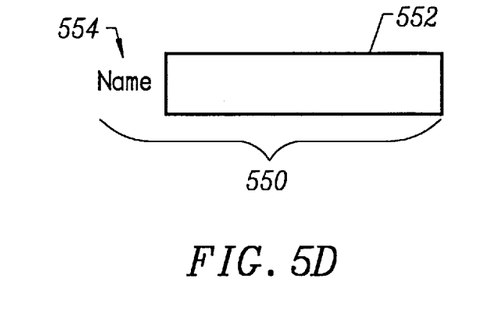
FIG. 5D is an illustration of a text entry application.

It may be useful at this point to consider an example application. FIG. 5D is an illustration of a text entry application 550. Text entry application 550 includes a label 552 and a text entry box 552. To run text entry application 550, all of the common attributes such as length, width and x and y location are necessary. A custom attribute that provides the button label, "Name," is also provided. The button label is a custom attribute because it is not likely to be changed by a user and so there is little point in transferring its contents back and forth every time that the user provides input in text entry box 552. The text in text entry box 552 is a data attribute because it is likely to be changed as a result of user input and so will be transmitted between platforms. The organization of data attributes into categories is important, because, as is described below, when data is sent between platforms, significant simplification and bandwidth savings results from sending entire attribute data blocks instead of individual attribute data encapsulated in an object along with methods to read the attributes. Storing data attribute data blocks separately from custom attribute data blocks allows whole blocks of data attribute data to be transferred without custom attribute data.

So far, the three types of attribute definition blocks included in attribute information block 306 of TYPE INFO file 300 have been described in detail. Now, the attribute data blocks included within application description file 400 will be described. The structure of each attribute data block is the same as the default value block in the corresponding attribute definition block. This is because the default value block functions to provide values for attributes that have not received values yet. Values may be received by either local input or by receiving an application description file from another platform that contains the values. When that occurs, the attribute data block received simply overwrites the data area in memory for the instantiated that previously contained the default data block. In this manner, no parsing of the data block is required to store it. An entire data block is received and the data block is read directly into memory, overwriting the default data block which was identical in format. When an object is instantiated directly from an application description file as is described below, the default data block is never used and again, the attribute data blocks from the application description file are plugged directly into memory, this time with no overwrite necessary.

Thus, data transfer is generally accomplished between platforms by sending entire attribute data blocks that are then plugged directly into the correct memory location defined for an existing object that contains the attribute data at the target or receiving platform. This eliminates the need to do multiple sets to the memory location on the target platform where the attribute is stored and multiple gets from a buffer that holds the attribute data blocks. It is also possible to access individual attributes using the single set and the single get method that is described below and is included for each object type, since the set and get methods allow an attribute name to be specified. It should also be noted that when an object does not exist on the target platform corresponding to an attribute data block that is received, then all of the information necessary to instantiate the object is contained in the application description file that is received by the target platform since the application description file contains a type ID that identifies the type info file. The object is then instantiated using the specified type info file. In such a case, the default data from the default value blocks is not used. Instead, the attribute data blocks from the application description file is used.

Figure 6:
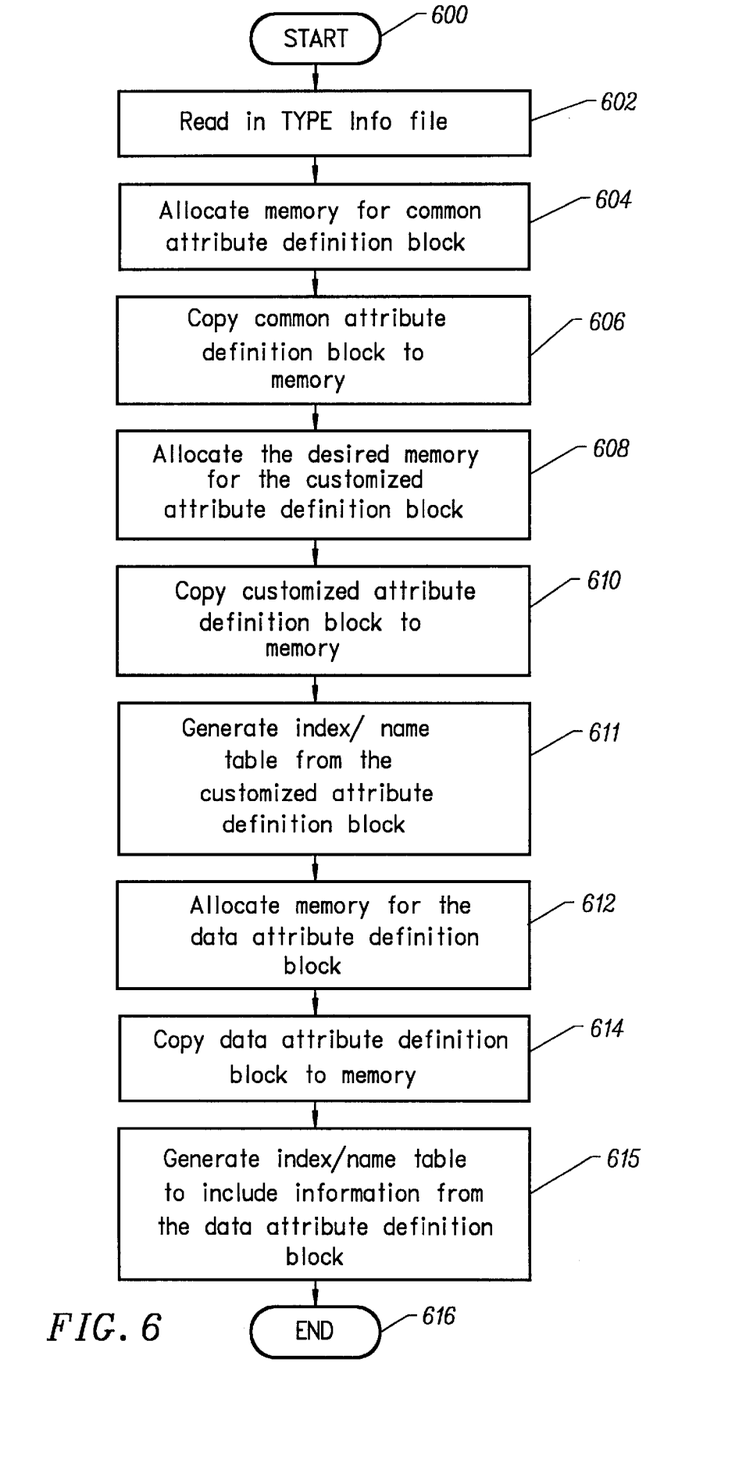
FIG. 6 is a process flow diagram illustrating a process that instantiates a Type Info object using a TYPE INFO file.

FIG. 6 is a process flow diagram illustrating a process that instantiates a Type Info object using a TYPE INFO file. For each type, there is a Type Info object to hold all relevant information contained in the Type Info file for that particular type. The process starts at 600. In step 602, the VMX reads in the type info file. Next, in step 604, the VMX allocates the desired memory for the common attribute definition block. In step 606, the common attribute definition block is copied from the file to memory. In step 608, the VMX allocates the desired memory for the customized attribute definition block. Then, in step 610, the customized attribute definition block is copied from the file to memory. In step 611, an index/name table is generated from the information in the customized attribute definition block. The index/name table is a hash table that provides the memory offset and data type that corresponds to each attribute. The attribute name is used as a key and the index, which gives the memory location is the returned value. As will be described below, the index/name table enables the set and get methods to write and read data from a memory location when given the attribute name as an argument.

In step 612, the VMX allocates the desired memory for the data attribute definition block. Then, in step 614, the data attribute definition block is copied from the file to the memory. In step 615, the index/name table is generated to include the information in the data attribute definition block as well as the information from the customized attribute definition block. It should be noted that in certain embodiments, the index/name table is also generated to include the common attribute definition block and in some embodiments, the index/name table is generated in a single step to include all attribute definitions, including common, customized, and data attribute definitions. As noted above, the index/name table is a hash table that provides the memory offset and data type that corresponds to each attribute. The process ends at 616. Thus, a Type Info object may be instantiated using the TYPE INFO file.

If an application description file is provided to instantiate an object, then the type ID is used first to find the TYPE INFO object file. Instead of using the default data blocks contained in the attribute definition blocks of the TYPE INFO object, the attribute data blocks from the application description file are used. Similarly, if an application description file is received for an object that has already been instantiated, then the attribute data blocks are plugged directly into the appropriate memory locations, overwriting any data already there.

Figure 7:
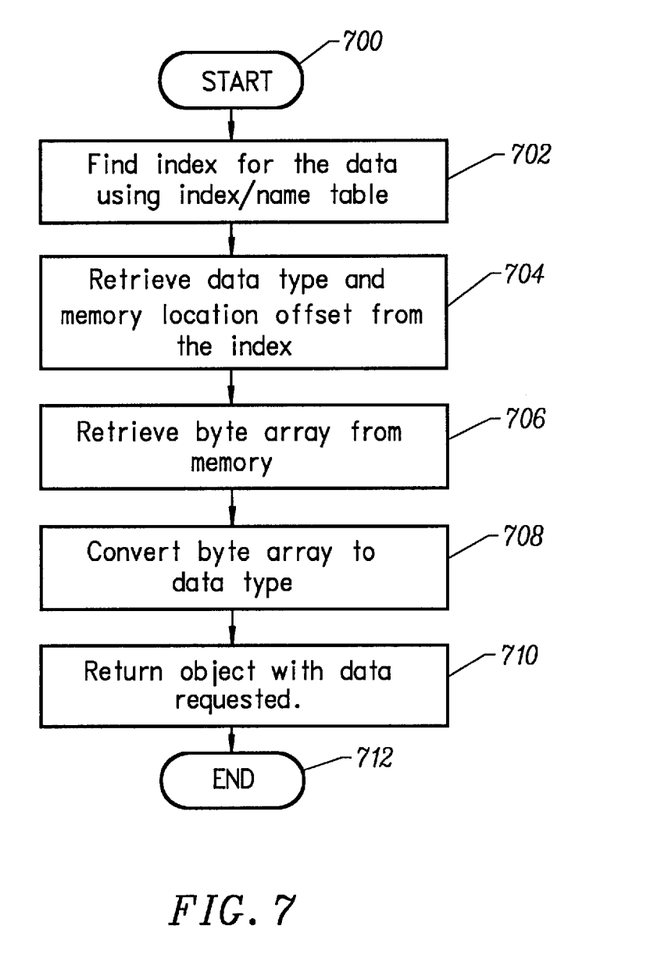
FIG. 7 is a process flow diagram illustrating a process for retrieving data from memory using a GetAttribute command.

FIG. 7 is a process flow diagram illustrating a process for retrieving data from memory using a GetAttribute command. The GetAttribute command has as an argument a string name. The process starts at 700. In step 702, the VMX finds the index for the data using the string name argument and the index/name table of the Type Info object associated with the object on which the GetAttribute command is to be performed. In step 704, the data type and location offset is retrieved from the index. Next, in step 706, the byte array is retrieved from memory at the location specified in the index. The byte array is converted to the data type indicated in the index in step 708. In step 710, an object is returned with the data requested by the GetAttribute command. The process ends at 712.

Figure 8:
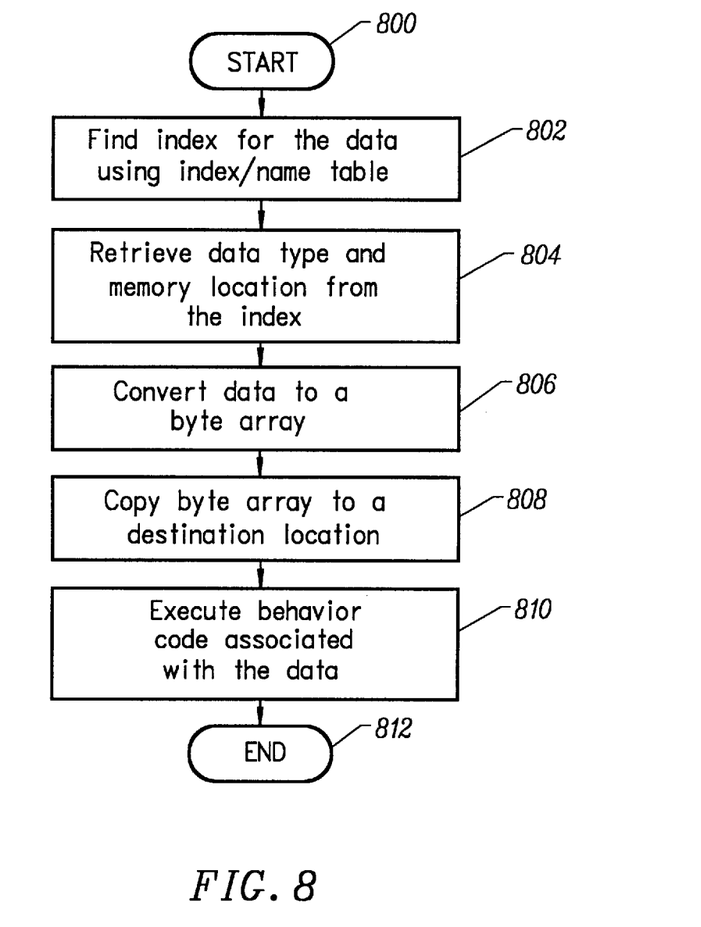
FIG. 8 is a process flow diagram illustrating a process for retrieving data from memory using a SetAttribute command.

FIG. 8 is a process flow diagram illustrating a process for retrieving data from memory using a SetAttribute command. The SetAttribute command has as arguments a string name and object data to be stored. The process starts at 800. In step 802, the VMX finds the index of the data using the string name argument and the index/name table of the Type Info object associated with the object on which the SetAttribute command is to be performed. In step 804, the data type and location offset is retrieved from the index. Next, in step 806, the data is converted to a byte array according to the data type. In a step 808, the byte array is copied to the destination location which has the size of the data type. In step 810, the behavior code associated with the data is executed and the process ends at 812.

Thus, it has been shown that data may be transferred between platforms by transferring attribute data blocks. When an object is instantiated in memory, individual attributes may be accessed using a single set and a single get method that has the attribute name as an argument and that uses an index/name table to retrieve the attribute information stored at a memory location that corresponds to the memory offset found in the index/name table.

Although the foregoing invention has been described in some detail for purposes of clarity of understanding, it will be apparent that certain changes and modifications may be practiced within the scope of the appended claims. For example, fewer or more categories of attributes may be defined in other embodiments. It should be noted that there are may alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of transferring object attributes between platforms in a distributed computing environment comprising:

creating an application description file, the application description file including a type ID and an object name, wherein the type ID references a type information file, the application file further including an attribute data block, wherein the attribute data block contains data for attributes that are included in the object;

transferring the attribute description file to a platform, the platform including the type information file wherein the type information file includes a memory offset map that determines a sequence of attribute data storage in the attribute data block;

whereby the object attributes are received by the platform and the type information file provides a memory offset map for individual attributes in the attribute description file.

2. A method as recited in claim 1 further including:

instantiating a type information object corresponding to the type information file and generating an index/name table that indicates a memory offset for one or more attributes in the type information object.

3. A method as recited in claim 2 further including:

instantiating an application object according to the type information file and including attribute data from the attribute description file.

4. A method as recited in claim 3 wherein the index/name table generated for the type information object is used to determine a memory offset for data stored by a set command associated with the application object.

5. A method as recited in claim 3 wherein the index/name table generated for the type information object is used to determine a memory offset for data retrieved by a get command associated with the application object.

6. A method as recited in claim 1 wherein the type information file includes a plurality of attributed definition blocks.

7. A method as recited in claim 6 wherein the attribute definition blocks include a memory map block, a default value block, and an upper-lower value block.

8. A method as recited in claim 7 wherein the plurality of attribute definition blocks includes a common attribute definition block.

9. A method as recited in claim 7 wherein the plurality of attribute definition blocks includes a customized attribute definition block.

10. A method as recited in claim 7 wherein the plurality of attribute definition blocks includes a data attribute definition block.

11. A method as recited in claim 7 wherein attribute data that is associated with the data attribute definition block is included in the application description file and data that is associated with the customized attribute definition block is excluded from the application description file.

12. A method as recited in claim 7 wherein attribute data that is associated with the data attribute definition block is included in the application description file and data that is associated with the common attribute definition block is excluded from the application description file.

13. A type information data structure for storing information associated with an object type that is used to instantiate objects of the object type comprising:

an attribute definition block including a memory map block, a default value block, and an upper-lower value block, wherein the memory map block includes a list of attribute ID blocks, the attribute ID blocks including a name and type block, a default offset block, and an upper-lower offset block;

wherein the default value block includes a default value associated with an attribute ID block at a location specified by the default offset block;

wherein the upper-lower value block includes an upper-lower limit associated with an attribute ID block at a location specified by the default offset block;

whereby type information is stored so that objects of the object type may be instantiated.

14. A data structure as recited in claim 13 further including a plurality of attribute definition blocks.

15. A data structure as recited in claim 14 wherein the plurality of attribute definition blocks includes a common attribute definition block, a customized attribute definition block, and a data attribute definition block.

16. A computer readable medium on which data is stored according to the data structure of claim 13.

17. A network communication line on which data is transmitted, the data being organized according to the data structure of claim 13.

* * * * *